United States Patent
Shimazu et al.

(10) Patent No.: US 7,545,416 B2
(45) Date of Patent: Jun. 9, 2009

(54) IMAGE PROCESSING DEVICE AND CAMERA INCLUDING CPU WHICH DETERMINES WHETHER PROCESSING PERFORMED USING EXTERNAL MEMORY

(75) Inventors: Yoshihisa Shimazu, Kyoto (JP); Keiichi Tsumura, Hyogo (JP); Takahiro Iwasawa, Kyoto (JP); Nobuyuki Minakata, Osaka (JP); Takeshi Hirayama, Osaka (JP)

(73) Assignee: Panasonic Corporation, Osaka (JP)

( * ) Notice: Subject to any disclaimer, the term of this patent is extended or adjusted under 35 U.S.C. 154(b) by 624 days.

(21) Appl. No.: 10/805,194

(22) Filed: Mar. 22, 2004

(65) Prior Publication Data
US 2004/0196390 A1    Oct. 7, 2004

(30) Foreign Application Priority Data
Apr. 2, 2003    (JP) .............................. 2003-098836

(51) Int. Cl.
*H04N 5/76*    (2006.01)
(52) U.S. Cl. ................................. 348/231.9; 348/222.1
(58) Field of Classification Search ............ 348/231.99, 348/231.9, 222.1, 231.6, 231.7, 231.1; 386/117
See application file for complete search history.

(56) References Cited
U.S. PATENT DOCUMENTS
5,153,730 A * 10/1992 Nagasaki et al. ......... 348/231.6
5,966,116 A * 10/1999 Wakeland .................... 345/658
6,269,183 B1    7/2001 Matoba et al.
6,326,997 B1   12/2001 Nam
6,546,156 B1    4/2003 Kanzaki et al.
6,809,422 B2 * 10/2004 Saito et al. .................. 257/778
7,116,358 B1 * 10/2006 Sasaki ..................... 348/222.1

FOREIGN PATENT DOCUMENTS
| JP | 7-131748 | 5/1995 |
| JP | 2000-232959 | 8/2000 |
| JP | P2000-354193 A | 12/2000 |
| JP | 2001-346092 | 12/2001 |
| JP | 2002-199281 | 7/2002 |

OTHER PUBLICATIONS

Japanese Office Action, with English translation, issued in Japanese Patent Application No. JP 2003-098836, mailed May 27, 2008.

* cited by examiner

*Primary Examiner*—Tuan V Ho
(74) *Attorney, Agent, or Firm*—McDermott Will & Emery LLP

(57) ABSTRACT

An image processing device for performing image processing for an image signal output from an image sensor and outputting the results, including: an internal memory having line memories for storing an image by row or column; an image processing section for performing the image processing using the internal memory; and a CPU for controlling the image processing section. The image processing section includes a plurality of processing circuits each performing predetermined processing as the image processing. At least one of the plurality of processing circuits is configured to allow use of an external memory provided outside the image processing device as required.

10 Claims, 16 Drawing Sheets

IMAGE PROCESSING DEVICE AND CAMERA INCLUDING CPU WHICH DETERMINES WHETHER PROCESSING PERFORMED USING EXTERNAL MEMORY

BACKGROUND OF THE INVENTION

The present invention relates to an image processing device that processes a signal output from an image sensor and outputs the processed signal.

In digital cameras that use a charge-coupled device (CCD), a complementary metal oxide semiconductor (CMOS) image pickup device or the like as the image sensor, such as digital still cameras, digital camera-equipped mobile phones and digital video cameras, an image processing device performs image processing for an image signal read from the image sensor and outputs the results to a display device. In this relation, reading of an image from the image sensor and outputting of the image signal to the display device are made every line of a frame. Accordingly, in many cases, each function block of the image processing device performs its processing using a line memory that can store data by line.

With the increase of the number of pixels of image sensors, the number of pixels of one line has increased and this has raised the need for increasing the capacity of line memories. To respond to this need, there is disclosed an image processing device in which an external memory capable of storing data of one entire frame is used and image processing is performed by block (see Japanese Laid-Open Patent Publication No. 2000-354193, for example).

FIG. 16 is a block diagram of an example of a conventional camera, showing a configuration disclosed in the publication described above. In FIG. 16, an image signal read from an image sensor by line is stored in an external memory 914. An image processing device (signal processing circuit) 916 performs image processing for the image signal stored in the external memory 914 by reading the image signal by block, and stores the processed signal again in the external memory 914. A display device reads the processed signal from the external memory 914 for display.

Recent digital cameras are requested to achieve various extended functions of scaling down an image, rotating an image and the like, in addition to the function of taking pictures. They are also requested to provide a plurality of image-quality modes in consideration of the capacities of recording media. In other words, the image processing device is required to perform a plurality of processing items, and the capacity of the memory required and the way of use of the memory vary with the processing item.

In the camera of FIG. 16, image processing is performed by block. Accordingly, four times of access to the external memory 914 are necessary whichever type of processing is to be performed. Specifically, access to the external memory is necessary when an image signal read from the image sensor by line is written, when the image processing device reads the stored image signal by block, when the image-processed data is written by block, and when the stored image-processed signal is read for display.

In general, access to an external memory consumes much power and requires long processing time, compared with access to an internal memory. Accordingly, a system as that described above that makes access to an external memory invariably during image processing has a problem that at least some amounts of power and processing time are necessary regardless of the type of the processing.

In the processing by block, data of a pixel belonging to a plurality of blocks in duplication is read a plurality of times. Therefore, the number of times of access to the external memory increased compared with the case of reading data once for each pixel. This also causes a problem in power consumption and processing time.

Image processing devices can be mounted in various systems such as digital still cameras, digital video cameras and digital camera-equipped mobile phones. The functions required for the image processing devices however differ among the systems. For example, in digital still cameras, in which an image having a large number of pixels must be processed, extended functions such as on-screen display (OSD) processing and rotation are naturally required. In digital camera-equipped mobile phones, in which the number of pixels of an image processed is small, extended functions such as scaledown and rotation are not required in many cases. In this case, therefore, no external memory is necessary. However, in the prior art disclosed in the above publication, the image processing device inevitably requires the external memory regardless of the system for which the image processing device is used.

Different image processing devices may be mounted in different systems. Recently, however, reduction in the development cost of image processing devices has been strongly requested. In this situation, it is desired that one type of image processing device can be used for a plurality of systems.

SUMMARY OF THE INVENTION

An object of the present invention is providing an image processing device capable of achieving both low power consumption and multi-function capability. Another object of the present invention is providing a highly versatile image processing device usable for various systems.

Specifically, the present invention is directed to an image processing device for performing image processing for an image signal output from an image sensor and outputting the results, including: an internal memory having line memories for storing an image by row or column as a unit; an image processing section for performing the image processing using the internal memory; and a CPU for controlling the image processing section, wherein the image processing section includes a plurality of processing circuits each performing predetermined processing as the image processing, and at least one of the plurality of processing circuits is configured to allow use of an external memory provided outside the image processing device as required.

According to the invention described above, the image processing device can select either achieving reduction in power consumption and enhancement in processing speed by using the internal memory or realizing an extended function requiring a large capacity of memory by using the external memory. Therefore, when no external memory is provided, the image processing device is adapted to perform basic image processing while achieving reduced power consumption. When an external memory is provided, the image processing device is adapted to achieve multi-function capability. Such an image processing device can be mounted in various types of systems, and thus the development cost of systems can be reduced.

Since the internal memory stores data by line, it is not necessary to store data in an external memory temporarily before being transferred to a display device. Therefore, in the entire system, reduction in power consumption and enhancement in processing speed can be achieved.

In the image processing device described above, the image processing section preferably performs given processing as the image processing without use of the external memory when the given processing can be performed without use of the external memory.

According to the invention described above, access to the external memory is made only when necessary. This enables reduction in power consumption and enhancement in the processing speed.

In the image processing device described above, the CPU preferably outputs a control signal for reducing power consumed by the external memory when the image processing section does not use the external memory.

According to the invention described above, power consumed by the external memory can be reduced when no access to the external memory is made. This further reduces power consumption.

In the image processing device described above, the image processing section preferably includes as the plurality of processing circuits: a luminance/color-difference signal processing circuit for converting the image signal obtained from the image sensor to a luminance signal and a color-difference signal and outputting the converted signals; and a compression circuit for performing compression coding of an image corresponding to the output of the luminance/color-difference signal processing circuit and outputting the results as an output of the image processing section.

In the image processing device described above, the image processing section preferably includes an on-screen display processing circuit for superimposing an image read from the external memory on the image obtained from the image sensor and outputting the results.

In the image processing device described above, preferably, one of the plurality of processing circuits stores a processed image into the external memory sequentially by row or column as a unit, and another one of the plurality of processing circuits reads the image stored in the external memory by column or row as a unit whichever different from the unit used during the storing of the image.

According to the invention described above, rotation of an image can be realized.

In the image processing device described above, at least two of the plurality of processing circuits preferably perform processing using the same internal memory.

According to the invention described above, the capacity of the internal memory can be reduced compared with the case of providing exclusive memories for the plurality of processing items.

In the image processing device described above, preferably, the image processing section stores the image output from the image sensor into the external memory, reads the stored image from the external memory by row or column as a unit whichever has a smaller number of pixels, performs the image processing for the read data using the internal memory, stores the results into an area of the external memory in which the corresponding pixel data had been stored before being read, and reads the resultant image from the external memory to be output.

According to the invention described above, image processing can be performed for an image of a landscape shape having a horizontal number of pixels exceeding the number of pixels of one row allowed to be stored in the internal memory.

In the image processing device described above, preferably, the image processing section divides the image into a plurality of areas if the number of pixels of each row or column of the image whichever is smaller exceeds the number of pixels allowed to be stored in the internal memory.

The camera of the present invention includes: the image processing device described above; an image sensor for outputting an image signal to the image processing device; and a recording device for writing an output of the image processing device into a recording medium.

DESCRIPTION OF THE PREFERRED EMBODIMENTS

Hereinafter, a preferred embodiment of the present invention will be described with reference to the accompanying drawings.

Figure 1:
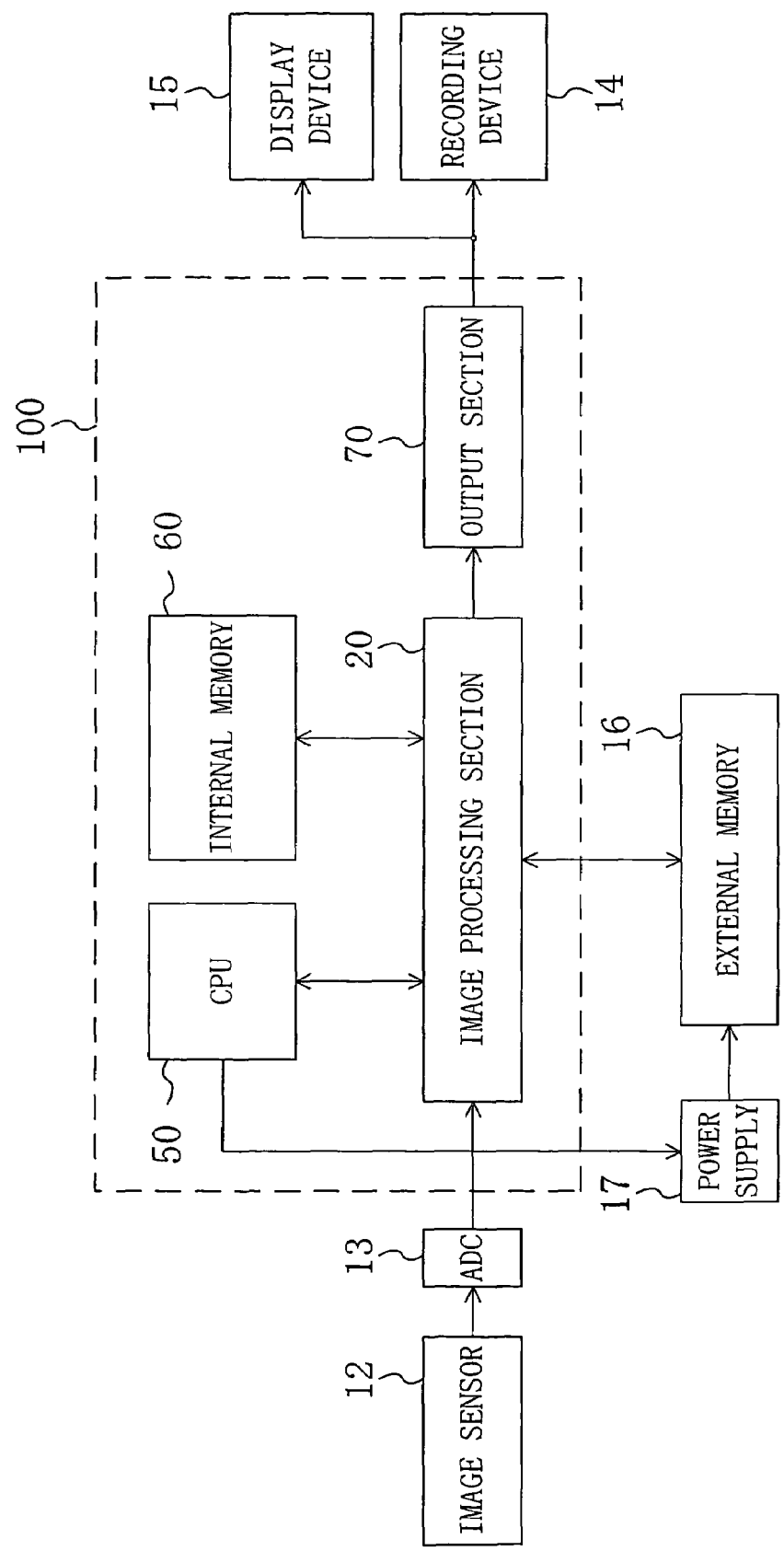
FIG. 1 is a block diagram of an example of a camera having an image processing device of an embodiment of the present invention.

FIG. 1 is a block diagram of an example of a camera having an image processing device of an embodiment of the present invention. The camera of FIG. 1 is a digital still camera, a digital camera-equipped mobile phone or a digital video camera, for example. The camera of FIG. 1 includes an image processing device 100, an image sensor 12, an AD converter (ADC) 13, a recording device 14, a display device 15, an external memory 16 and a power supply circuit 17. The image processing device 100 includes an image processing section 20, a CPU 50, an internal memory 60 and an output section 70. Note that lines of pixels in the horizontal direction and those in the vertical direction are herein referred to as rows and columns, respectively.

The image sensor 12, which is a CCD or a CMOS image pickup device, for example, outputs an image signal to the AD converter 13. The AD converter 13 converts the input signal to digital data and outputs the resultant data to the image processing section 20.

The image processing section 20 performs image processing for the output of the image sensor 12 under instructions from the CPU 50 and outputs the results to the output section 70. In performing the image processing, the image processing section 20 uses at least one of the internal memory 60 and the external memory 16 depending on the type of the processing.

The internal memory 60 has a plurality of line memories for storing an image by row or column. Each line memory has a capacity permitting storage of data of m pixels (m is a natural number) (this capacity is referred to as 1H). Since pixels of one row of an image are not stored over a plurality of line memories, m is the maximum number of pixels that can be stored in the internal memory 60 as one row of pixels. In general, therefore, m is the maximum number of pixels of one row of an image that can be processed by the image processing device 100. Assume herein that m=1280 and the internal memory 60 has 18 line memories, for example.

The external memory 16 is used as a frame memory and has a capacity permitting storage of at least one frame of the largest image that can be processed by the image processing device 100.

The power supply circuit 17 supplies power to the external memory 16 under instructions from the CPU 50. The output section 70 has a buffer and operates as an interface that converts the output of the image processing section 20 to signals in forms suitable for write into a recording medium in the recording device 14 and for display with the display device 15 and outputs the resultant signals. The recording device 14 writes the output of the output section 70 into the recording medium such as a memory card. The display device 15, which is a liquid crystal display, for example, displays an image output from the image sensor 12 for monitoring.

Figure 2:
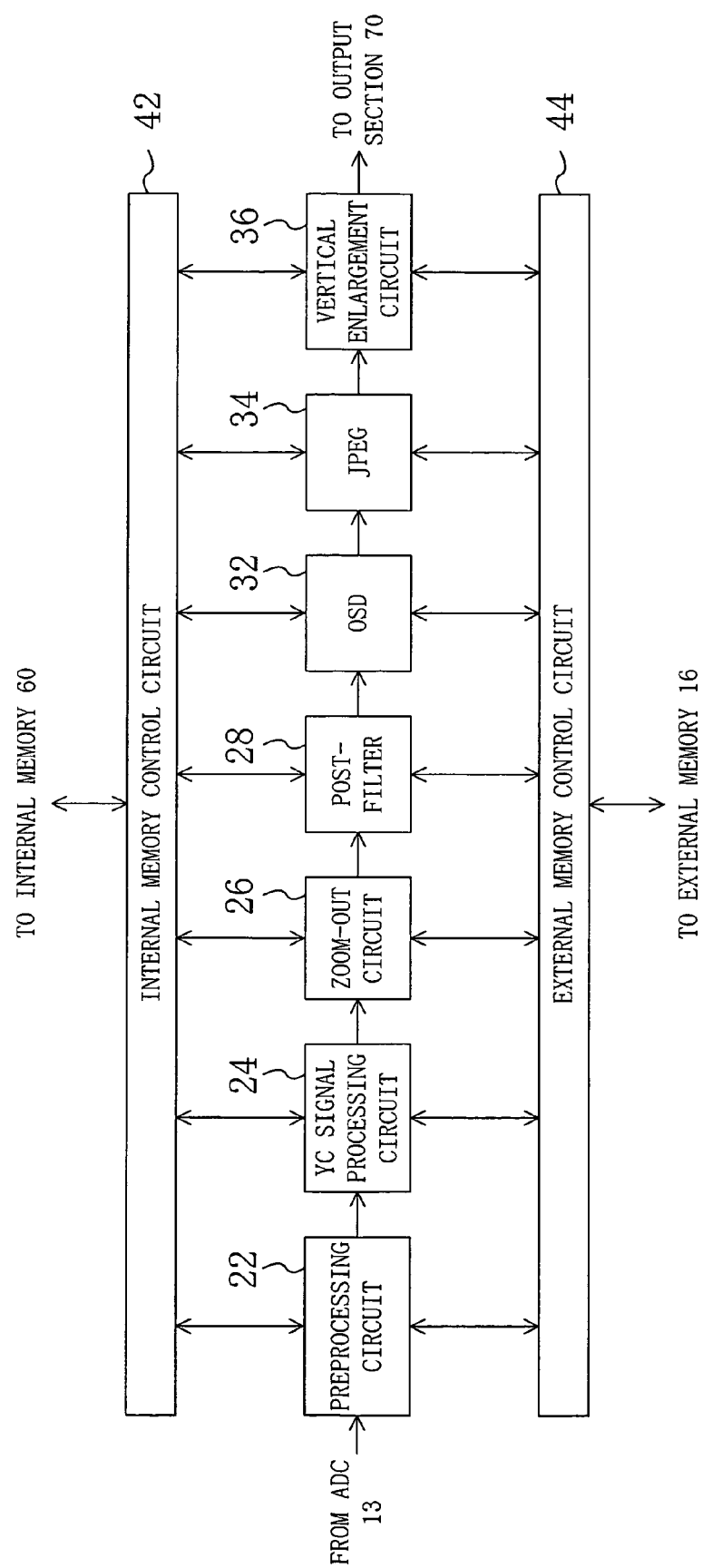
FIG. 2 is a block diagram of an example of an image processing section in FIG. 1.

FIG. 2 is a block diagram of an example of the image processing section 20 in FIG. 1. The image processing section 20 includes a preprocessing circuit 22, a luminance/color-difference signal processing circuit (YC signal processing circuit) 24, a zoom-out circuit 26, a post-filter 28, an OSD processing circuit 32, a JPEG (joint photographic image coding experts group) processing circuit 34 and a vertical enlargement circuit 36. The image processing section 20 further includes an internal memory control circuit 42 and an external memory control circuit 44. All of these circuits of the image processing section 20 operate under instructions from the CPU 50.

Assume that the preprocessing circuit 22, the YC signal processing circuit 24, the zoom-out circuit 26, the post-filter 28, the OSD processing circuit 32, the JPEG processing circuit 34 and the vertical enlargement circuit 36 are allowed to output received data as it is with no processing performed for the data. These circuits access the internal memory 60 via the internal memory control circuit 42 and the external memory 16 via the external memory control circuit 44. Therefore, these circuits are allowed to pass data among themselves via the external memory 16.

The preprocessing circuit 22, the YC signal processing circuit 24, the zoom-out circuit 26, the post-filter 28, the OSD processing circuit 32, the JPEG processing circuit 34 and the vertical enlargement circuit 36 use the same internal memory in performing processing. To state differently, these processing circuits are configured to share the internal memory 60. The CPU 50 allocates areas of the internal memory 60 to these processing circuits according to the need of processing by the respective processing circuits.

The preprocessing circuit 22 performs at least one of extraction of the black level, detection of the white balance and gamma correction as preprocessing for an image signal output from the image sensor 12, and outputs the results to the YC signal processing circuit 24.

The YC signal processing circuit 24 receives the output of the preprocessing circuit 22, performs YC signal processing for the received signal, and outputs the results to the zoom-out circuit 26. The YC signal processing includes correction of the black level, correction of the white balance and conversion to a luminance signal and a color-difference signal.

The zoom-out circuit 26 performs zooming using linear interpolation to scale down an image represented by the luminance signal and the color-difference signal, and outputs the results to the post-filter 28.

The post-filter 28, which has a variable-coefficient low-pass filter, performs post-filtering that includes allowing passing of a low-frequency component of the image received from the zoom-out circuit 26 and performing aperture correction, and outputs the results to the OSD processing circuit 32.

The OSD processing circuit 32 reads image data for OSD from the external memory 16, performs OSD processing of superimposing the read data on the image received from the post-filter 28, and outputs the results to the JPEG processing circuit 34.

The JPEG processing circuit 34 as a compression circuit performs JPEG-based compression coding (JPEG compression) for the image received from the OSD processing circuit 32, and outputs the results to the output section 70 via the vertical enlargement circuit 36. The JPEG compressed results are then sent to the recording device 14 to be written into a recording medium such as a memory card.

The vertical enlargement circuit 36 receives the image output from the OSD processing circuit 32 via the JPEG processing circuit 34, vertically enlarges the received image so that the number of pixels in the vertical direction matches the display device 15, and outputs the results to the output section 70. The vertically enlarged results are then sent to the display device 15 to be displayed.

Figure 3:
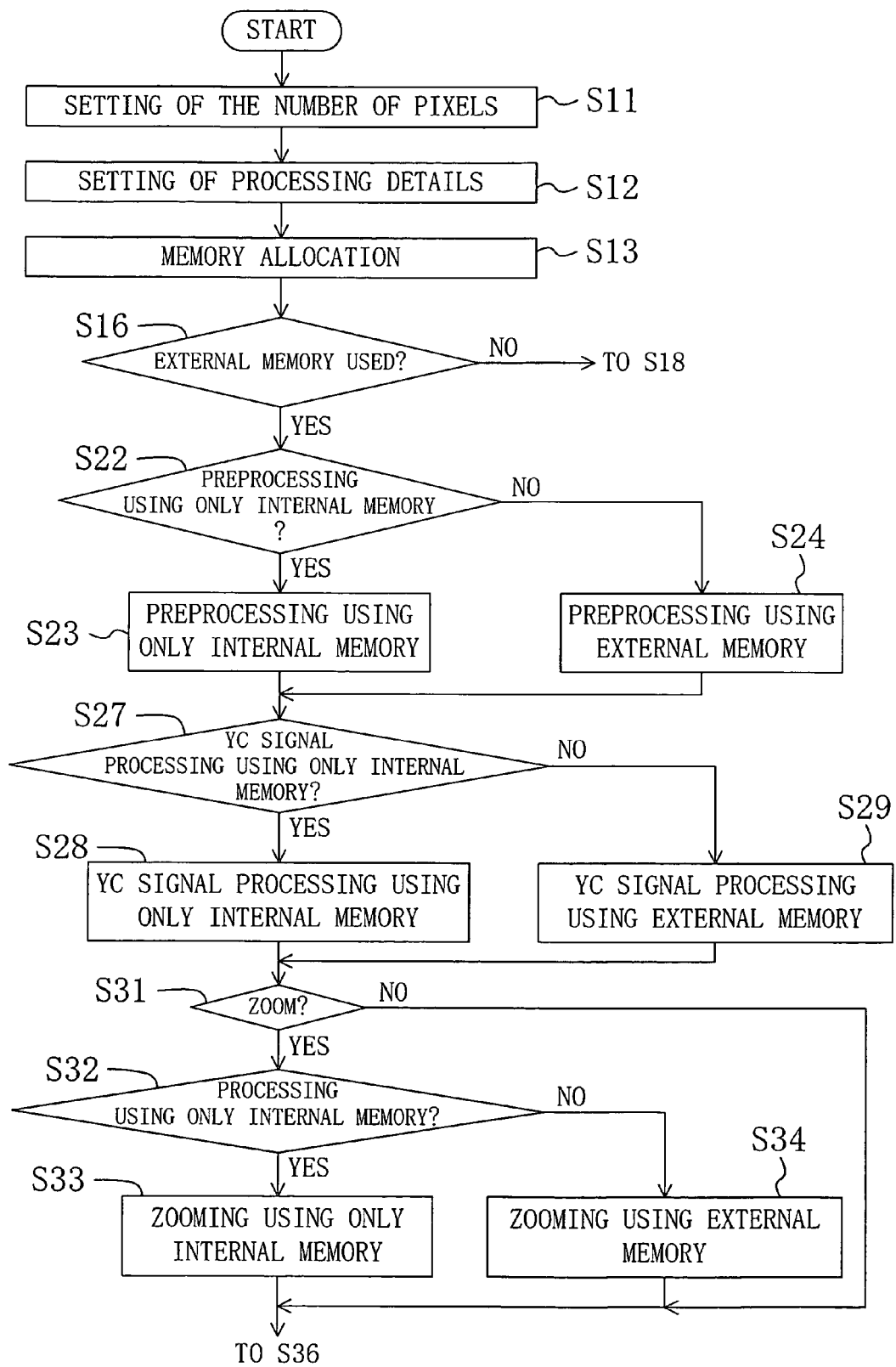
FIG. 3 is a flowchart showing a part of an example of a flow of processing performed by the image processing device in FIG. 1.
Figure 4:
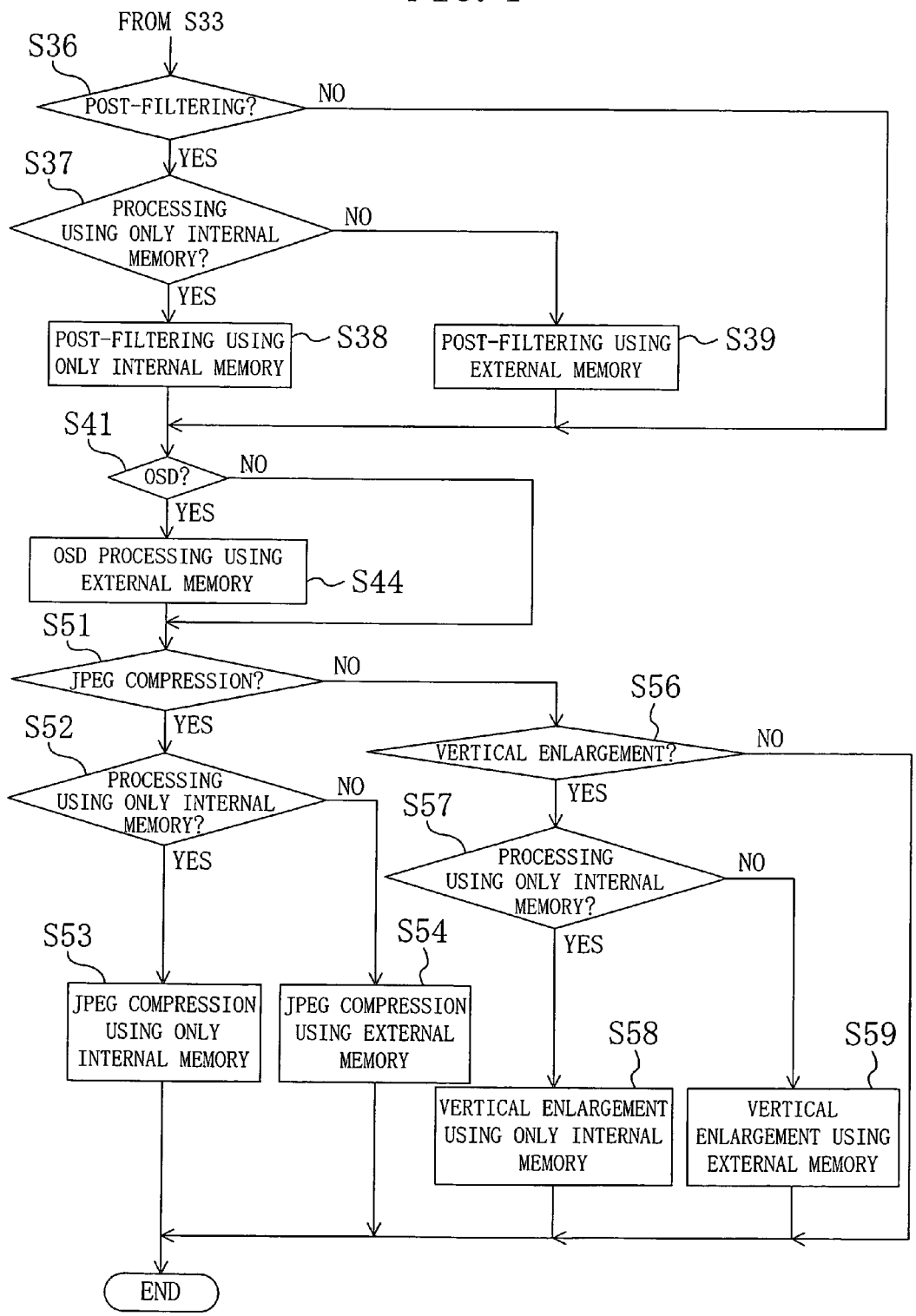
FIG. 4 is a flowchart showing another part of the example of the flow of processing performed by the image processing device in FIG. 1.
Figure 5:
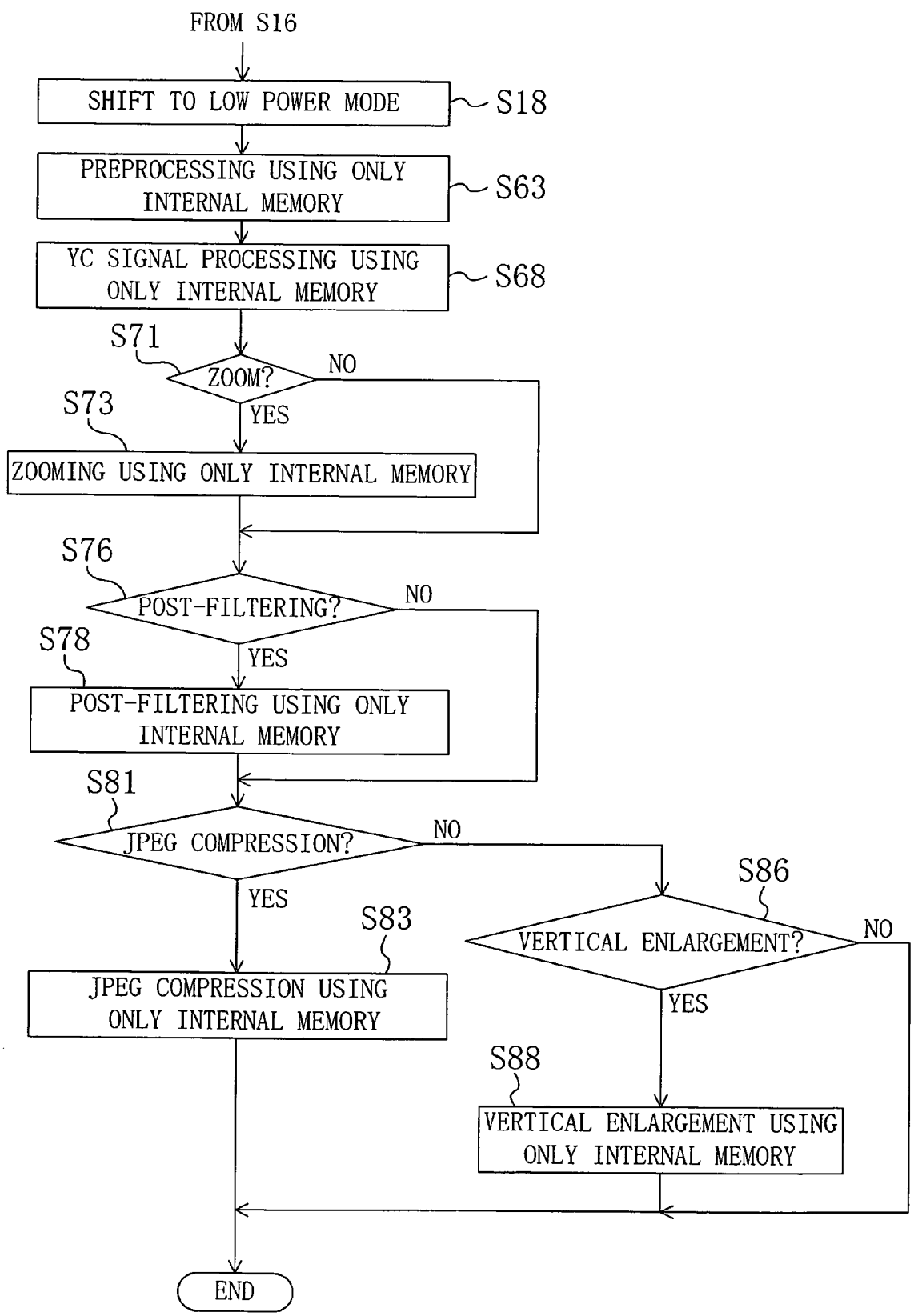
FIG. 5 is a flowchart showing the remaining part of the example of the flow of processing performed by the image processing device in FIG. 1.

FIGS. 3, 4 and 5 are flowcharts totally showing an example of a flow of processing performed by the image processing device 100 in FIG. 1.

Figure 6:
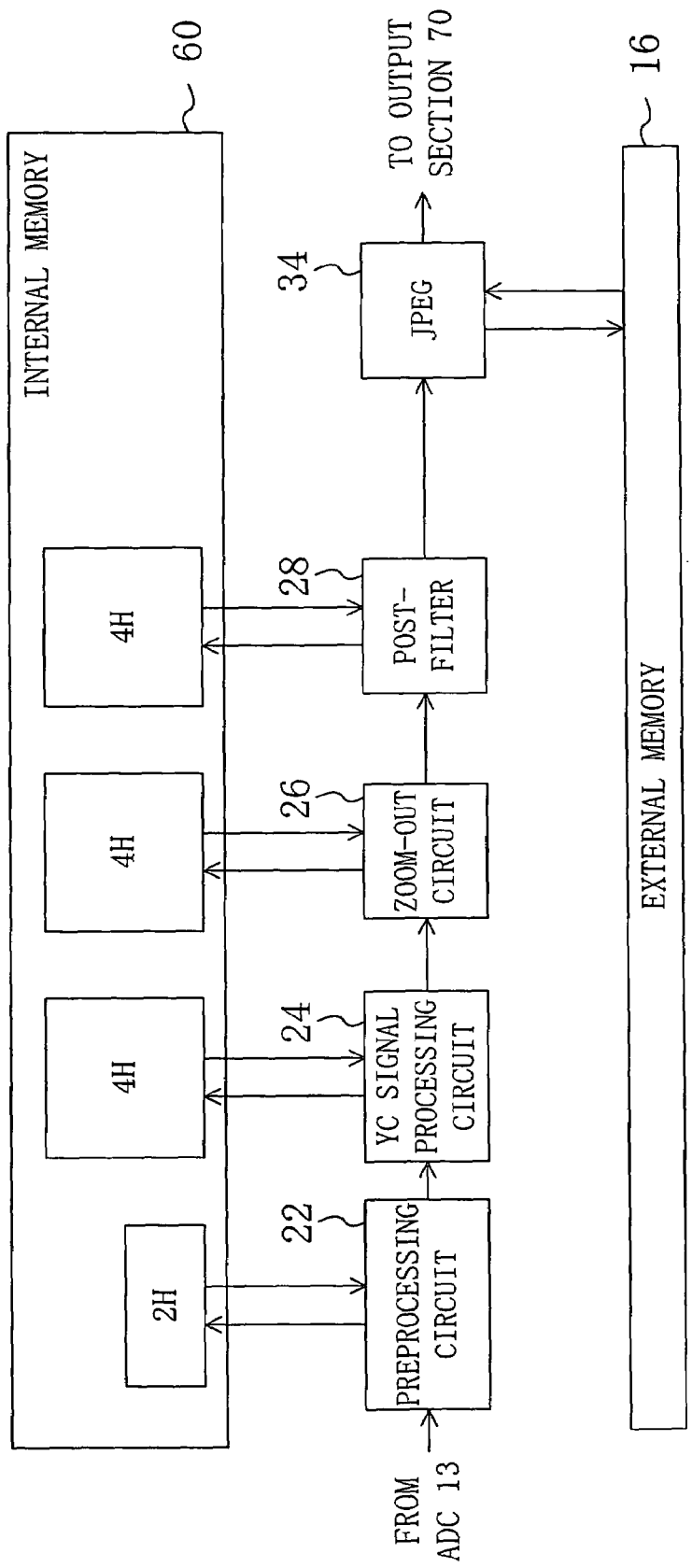
FIG. 6 is a view illustrating a first example of a flow of data in the image processing device in FIG. 1.

FIG. 6 is a view illustrating a first example of a flow of data in the image processing device 100 in FIG. 1. Note that the internal memory control circuit 42 and the external memory circuit 44 are omitted in FIG. 6 and similar figures to follow illustrating a flow of data. In the example of FIG. 6, assume that the size of an image output from the image sensor 12 is 1280 (=m) (horizontal)×960 pixels (vertical), and that preprocessing, YC signal processing, zooming (⅔X in this example), post-filtering and JPEG compression are performed as the image processing. In this case, the data amount of one horizontal row of an image input into the image processing device 100 corresponds to 1H. The operation of the image processing device 100 in this example will be described with reference to FIGS. 2 to 6.

In step S11 in FIG. 3, the CPU 50 sets the horizontal number of pixels of an image represented by a signal output from the image sensor 12 as the horizontal number of pixels of an image input into the image processing device 100. This value can be set from outside the image processing device 100 based on the type of the image sensor 12 connected. More specifically, it is set whether or not the horizontal number of pixels of an image handled by the image processing device 100 is ½ or less of the number of pixels (=m) allowed to be stored in each line memory of the internal memory 60.

If the horizontal number of pixels is m/2 or less, pixel data of two rows can be stored in one line memory, and this allows much processing to be performed using only the internal memory 60. If the horizontal number of pixels is more than m/2, pixel data of only one row can be stored in one line memory, and this limits the processing allowed to be performed using only the internal memory 60. Therefore, depending on whether or not the horizontal number of pixels is m/2 or less, it is necessary to change the capacities of areas of the internal memory 60 allocated to the respective processing circuits. In the illustrated example, in which m=1280, it is set that the horizontal number of pixels is more than m/2.

In step S12, the CPU 50 sets processing details. Specifically, set are whether or not zooming, post-filtering, JPEG compression, vertical enlargement, OSD processing, rotation and the like are performed, together with the scaling factor of the zooming, if the zooming is performed, and the like. In the example of FIG. 6, it is set that zooming, post-filtering and JPEG compression are performed and that the scaling factor of the zooming is ⅔.

In step S13, the CPU 50 allocates areas of the internal memory 60 and the external memory 16 to the processing circuits of the image processing section 20, that is, the preprocessing circuit 22, the YC signal processing circuit 24, the zoom-out circuit 26, the post-filter 28, the OSD processing circuit 32, the JPEG processing circuit 34 and the vertical enlargement circuit 36. It is therefore made possible for each processing circuit to select whether to perform its processing using only the internal memory 60 or using the external memory 16 additionally, as required.

The allocation of the internal memory 60 is made for only the processing items to be actually performed. An area of the external memory 16 is allocated to the OSD processing circuit 32 because OSD processing invariably requires use of the external memory 16. Rotation processing, which is to be discussed later, also requires use of the external memory 16, and therefore an area of the external memory 16 is allocated for this processing. In the case of performing zooming with a scaling factor of ½ or less, for example, pixel data of a plurality of rows can be stored in one line memory in the subsequent processing. This point is also considered in the allocation.

In the example of FIG. 6, in which the scaling factor of the zooming is ⅔, data of only one row of a scaled-down image can be stored in one line memory. In this case, if JPEG compression is performed using the internal memory 60, a line memory of 8H will be necessary. Considering the capacity (18H) of the internal memory 60, therefore, it is decided that line memories corresponding to 2H, 4H, 4H, and 4H of the internal memory 60 are allocated to the preprocessing circuit 22, the YC signal processing circuit 24, the zoom-out circuit 26. and the post-filter 28, respectively, and an area of the external memory 16 is allocated to the JPEG processing circuit 34.

In step S16, the CPU 50 determines whether or not the external memory 16 is used, considering whether or not a processing item requiring use of the external memory 16 is performed, or whether or not an external memory is in connection, for example. If the external memory 16 is used, the process proceeds to step S22. Otherwise it proceeds to step S18. In the example of FIG. 6, in which the JPEG processing circuit 34 uses the external memory 16, the process proceeds to step S22.

In step S22, the CPU 50 determines whether or not preprocessing is performed using only the internal memory 60. If only the internal memory 60 is used, the process proceeds to step S23. Otherwise it proceeds to step S24. In the example of FIG. 6, the process proceeds to step S23.

In step S23, the preprocessing circuit 22 performs preprocessing while conducting read/write with the area of the internal memory 60 allocated to this circuit, handling each horizontal row of an image represented by an image signal output from the image sensor 12 as one unit, and outputs the results to the YC signal processing circuit 24. The process then proceeds to step S27.

In step S24, as in step S23, the preprocessing circuit 22 performs preprocessing while conducting read/write with the area of the external memory 16 or the internal memory 60 allocated to this circuit, handling each horizontal row of an image as one unit, and outputs the results to the YC signal processing circuit 24. The process then proceeds to step S27.

In step S27, the CPU 50 determines whether or not YC signal preprocessing is performed using only the internal memory 60. If only the internal memory 60 is used, the process proceeds to step S28. Otherwise it proceeds to step S29. In the example of FIG. 6, the process proceeds to step S28.

In step S28, the YC signal processing circuit 24 performs YC signal processing while conducting read/write with the area of the internal memory 60 allocated to this circuit, and outputs the results to the zoom-out circuit 26. The process then proceeds to step S31.

In step S29, the YC signal processing circuit 24 performs YC signal processing while conducting read/write with the area of the external memory 16 or the internal memory 60 allocated to this circuit, and outputs the results to the zoom-out circuit 26. The process then proceeds to step S31.

In step S31, the CPU 50 determines whether or not zooming is performed. If zooming is performed, the process proceeds to step S32. Otherwise it proceeds to step S36. In the example of FIG. 6, in which zooming is performed, the process proceeds to step S32.

In step S32, the CPU 50 determines whether or not zooming is performed using only the internal memory 60. If only the internal memory 60 is used, the process proceeds to step S33. Otherwise it proceeds to step S34. In the example of FIG. 6, the process proceeds to step S33.

In step S33, the zoom-out circuit 26 performs zooming of reducing the number of pixels of an image while conducting read/write with the area of the internal memory 60 allocated to this circuit, and outputs the results to the post-filter 28. The process then proceeds to step S36. In the example of FIG. 6, the zoom-out circuit 26 scales down the image so that the horizontal number of pixels is reduced to ⅔.

In step S34, the zoom-out circuit 26 performs zooming while conducting read/write with the area of the external memory 16 or the internal memory 60 allocated to this circuit, and outputs the results to the post-filter 28. The process then proceeds to step S36.

In step S36 in FIG. 4, the CPU 50 determines whether or not post-filtering is performed. If post-filtering is performed, the process proceeds to step S37. Otherwise it proceeds to step S41. In the example of FIG. 6, in which post-filtering is performed, the process proceeds to step S37.

In step S37, the CPU 50 determines whether or not post-filtering is performed using only the internal memory 60. If only the internal memory 60 is used, the process proceeds to step S38. Otherwise it proceeds to step S39. In the example of FIG. 6, the process proceeds to step S38.

In step S38, the post-filter 28 performs post-filtering while conducting read/write with the area of the internal memory 60 allocated to the post-filter, and outputs the results to the OSD processing circuit 32. The process then proceeds to step S41.

In step S39, the post-filter 28 performs post-filtering while conducting read/write with the area of the external memory 16 or the internal memory 60 allocated to the post-filter, and outputs the results to the OSD processing circuit 32. The process then proceeds to step S41.

In step S41, the CPU 50 determines whether or not OSD processing is performed. If OSD processing is performed, the process proceeds to step S44. Otherwise it proceeds to step S51. In the example of FIG. 6, in which no OSD processing is performed, the process proceeds to step S51.

In step S44, the OSD processing circuit 32 reads image data for OSD from the external memory 16, performs OSD processing of superimposing the read data on the image received from the post-filter 28 using the area of the external memory 16 or the internal memory 60 allocated to this circuit, and outputs the results to the JPEG processing circuit 34. The process then proceeds to step S51.

In step S51, the CPU 50 determines whether or not JPEG compression is performed. If JPEG compression is performed, the process proceeds to step S52. Otherwise it proceeds to step S56. In the example of FIG. 6, in which JPEG compression is performed, the process proceeds to step S52.

In step S52, the CPU 50 determines whether or not JPEG compression is performed using only the internal memory 60. If only the internal memory 60 is used, the process proceeds to step S53. Otherwise it proceeds to step S54. In the example of FIG. 6, in which the external memory 16 is allocated to the JPEG processing circuit 34, the process proceeds to step S54.

In step S53, the JPEG processing circuit 34 performs JPEG compression while conducting read/write with the area of the internal memory 60 allocated to this circuit, and outputs the results to the output section 70 via the vertical enlargement circuit 36. The process is then terminated.

In step S54, the JPEG processing circuit 34 performs JPEG compression while conducting read/write with the area of the external memory 16 or the internal memory 60 allocated to this circuit, and outputs the results to the output section 70 via the vertical enlargement circuit 36. The process is then terminated.

In step S56, the CPU 50 determines whether or not vertical enlargement is performed. If vertical enlargement is performed, the process proceeds to step S57. Otherwise the process is terminated.

In step S57, the CPU 50 determines whether or not vertical enlargement is performed using only the internal memory 60. If only the internal memory 60 is used, the process proceeds to step S58. Otherwise it proceeds to step S59.

In step S58, the vertical enlargement circuit 36 performs vertical enlargement while conducting read/write with the area of the internal memory 60 allocated to this circuit, and outputs the results to the output section 70. The process is then terminated.

In step S59, the vertical enlargement circuit 36 performs vertical enlargement while conducting read/write with the area of the external memory 16 or the internal memory 60 allocated to this circuit, and outputs the results to the output section 70. The process is then terminated.

As described above, in the example of FIG. 6, the external memory 16 is accessed only during the JPEG compression by the JPEG processing circuit 34. The other items of the image processing can be performed without use of the external memory 16, and therefore the external memory 16 is not used in these cases. This greatly reduces the access to the external memory 16.

If the external memory 16 is not used at all, in step S18 in FIG. 5, the CPU 50 performs processing for shifting to a low power mode. For example, since the external memory 16 is no more used in the subsequent process steps, the CPU 50 halts supply of power to the external memory 16 by controlling the power supply circuit 17, to prevent the external memory 16 from consuming power.

The subsequent series of processing in FIG. 5 are similar to those described above with reference to FIGS. 3 and 4, except that the processing items are invariably performed using the internal memory with no determination on whether or not the internal memory is used, and that the step of asking whether or not OSD processing is performed and the step of performing OSD processing are not included. Specifically, steps S63, S68, S71, S73, S76, S78, S81, S83, S86 and S88 are respectively the same as steps S23, S28, S31, S33, S36, S38, S51, S53, S56 and S58, and thus the description thereof is omitted here. In this way, processing of one frame is terminated.

As described above, the image processing device 100 performs either the JPEG compression or the vertical enlargement. Also, the image processing device 100 halts supply of power to the external memory 16 when the external memory 16 is not used, to prevent the external memory 16 from consuming power.

Figure 7:
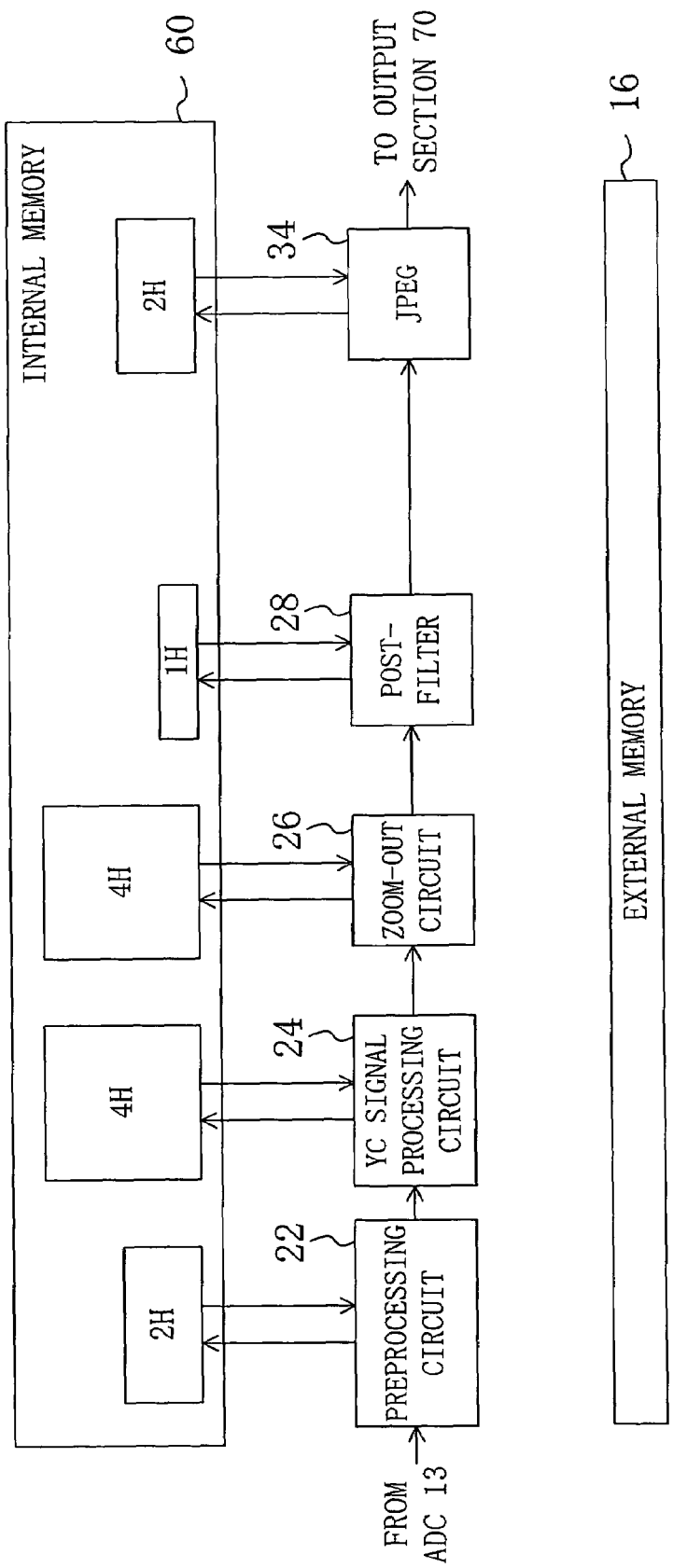
FIG. 7 is a view illustrating a second example of a flow of data in the image processing device in FIG. 1.

FIG. 7 is a view illustrating a second example of a flow of data in the image processing device 100 in FIG. 1. In the example of FIG. 7, as in the example of FIG. 6, assume that the size of an image output from the image sensor 12 is 1280 (=m) (horizontal)×960 pixels (vertical). In this example, assume that preprocessing, YC signal processing, zooming (¼X in this example), post-filtering and JPEG compression are performed as the image processing. The operation of the image processing device 100 in this example will be described with reference to FIGS. 2 to 5 and 7.

The processing in steps S11 and S12 is substantially the same as that in the example of FIG. 6, except that the scaling factor of the zooming is set at ¼.

In the example of FIG. 7, the horizontal number of pixels of an image input into the image processing device 100 is m and the scaling factor of the zooming is ¼. Accordingly, one line memory can store data of four rows of a scaled-down image. In step S13, therefore, the CPU 50 allocates line memories corresponding to 2H, 4H, 4H, 1H and 2H of the internal memory 60 to the preprocessing circuit 22, the YC signal processing circuit 24, the zoom-out circuit 26, the post-filter 28 and the JPEG processing circuit 34, respectively. The capacity of the internal memory 60 is sufficient for this allocation. Therefore, no allocation of the external memory 16 is made.

In step S16, the CPU 50 determines that the external memory 16 is not used, and the process proceeds to step S18. In step S18, supply of power to the external memory 16 is halted. The series of processing in and after step S63 are the same as those in the example of FIG. 6, except that each processing circuit invariably performs its processing while conducting read/write with the internal memory 60 with no determination by the CPU 50 on whether or not the internal memory 60 is used for the processing.

As described above, the image processing device 100 can perform basic image processing even when no external memory is provided as shown in FIG. 7. With no access to the external memory 16 during image processing, the power consumption can be reduced and the processing speed can be enhanced.

Figure 8:
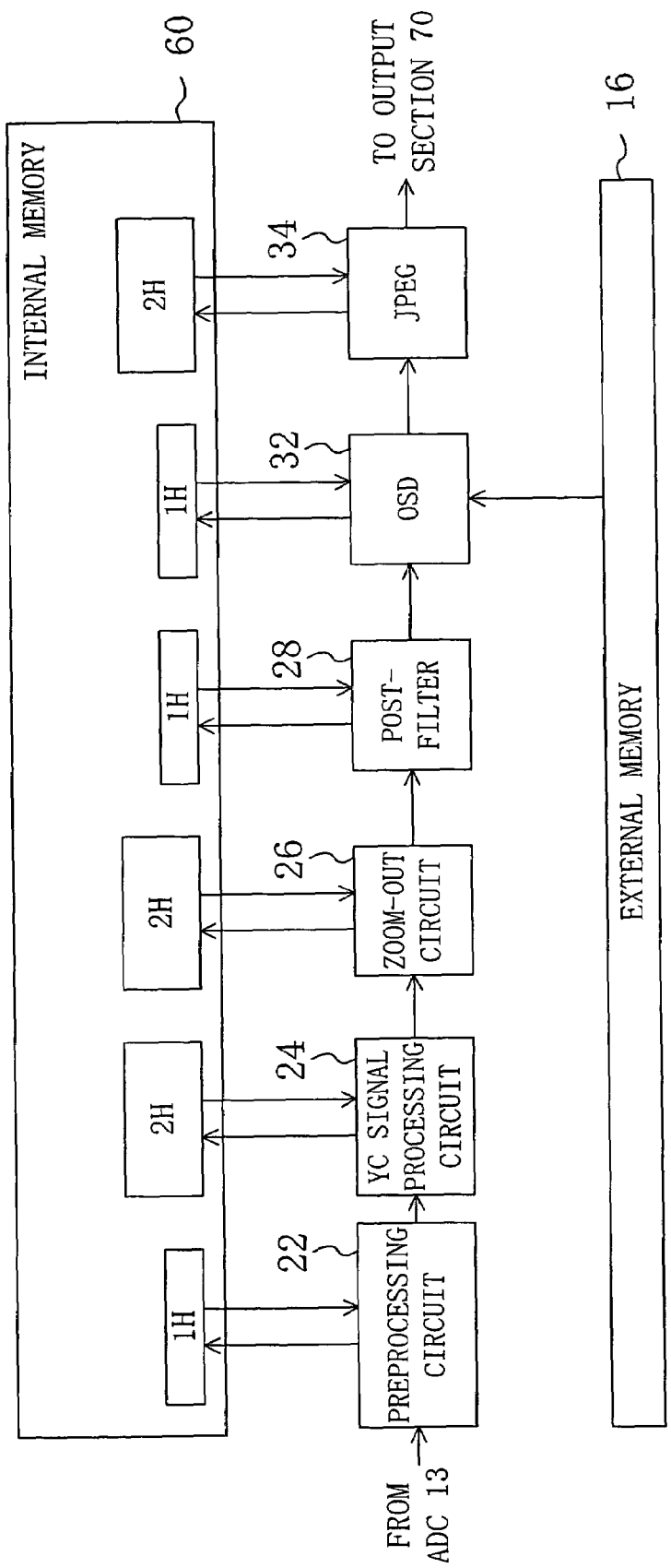
FIG. 8 is a view illustrating a third example of a flow of data in the image processing device in FIG. 1.

FIG. 8 is a view illustrating a third example of a flow of data in the image processing device 100 in FIG. 1. In the example of FIG. 8, assume that the size of an image output from the image sensor 12 is 640 (=m/2) (horizontal)×480 pixels (vertical), and that preprocessing, YC signal processing, zooming (½X in this example), post-filtering, OSD processing and JPEG compression are performed as the image processing. In this case, the data amount of one horizontal row of an image input into the image processing device 100 corresponds to ½H. The operation of the image processing device 100 in this example will be described with reference to FIGS. 2 to 4 and 8.

In step S11, the CPU 50 sets that the horizontal number of pixels of an image input into the image processing device 100 is m/2 or less. In step S12, the CPU 50 sets that zooming, post-filtering, OSD processing and JPEG compression are performed and that the scaling factor of the zooming is ½.

In the example of FIG. 8, the horizontal number of pixels of an image input into the image processing device 100 is m/2 and the scaling factor of the zooming is ½. Accordingly, data of four rows of a scaled-down image can be stored in one line memory. In consideration of this, in step S13, the CPU 50 allocates line memories corresponding to 1H, 2H, 2H, 1H, 1H and 2H of the internal memory 60 to the preprocessing circuit 22, the YC signal processing circuit 24, the zoom-out circuit 26, the post-filter 28, the OSD processing circuit 32 and the JPEG processing circuit 34, respectively. The capacity of the internal memory 60 is sufficient for this allocation. Therefore, no allocation of the external memory 16 is necessary.

In step S16, the CPU 50 determines that the external memory 16 is used because OSD processing is to be performed, and the process proceeds to step S22.

The series of processing in and after step S22 in FIGS. 3 and 4 are the same as those in the example of FIG. 6, except that in step S41, the CPU 50 determines that OSD processing is performed and proceeds to step S44, and that in step S44, the OSD processing circuit 32 performs OSD processing and outputs the results to the JPEG processing circuit 34. Detailed description of these steps is therefore omitted here.

As described above, by use of the external memory 16, OSD processing can be performed as an extended function. Also, in the example of FIG. 8, access to the external memory 16 is only once, which is made by the OSD processing circuit 32 for reading data. The internal memory 60 is used for the other cases of using a memory. This greatly reduces access to the external memory 16.

Figure 9:
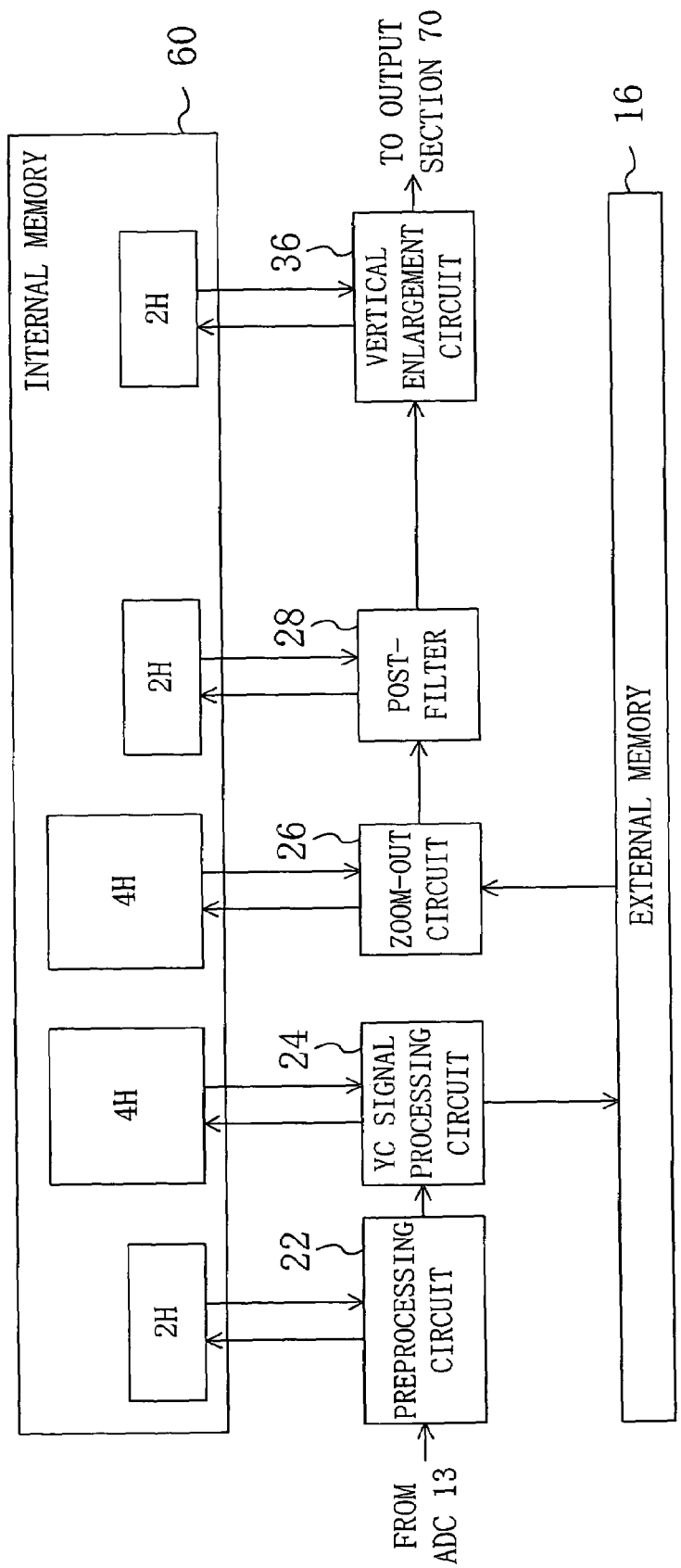
FIG. 9 is a view illustrating a fourth example of a flow of data in the image processing device in FIG. 1.

FIG. 9 is a view illustrating a fourth example of a flow of data in the image processing device 100 in FIG. 1. In the example of FIG. 8, assume that the size of an image output from the image sensor 12 is 1280 (=m) (horizontal)×960 pixels (vertical), and that preprocessing, YC signal processing, zooming (½X in this example), post-filtering, vertical enlargement and rotation are performed as the image processing. The operation of the image processing device 100 in this example will be described with reference to FIGS. 2 to 4 and 9.

In step S11, the CPU 50 sets that the horizontal number of pixels of an image input into the image processing device 100 exceeds m/2. In step S12, the CPU 50 sets that zooming, post-filtering, vertical enlargement and rotation are performed and that the scaling factor of the zooming is ½.

In the example of FIG. 9, the horizontal number of pixels of an image input into the image processing device 100 is m and the scaling factor of the zooming is ½. Accordingly, data of two rows of a scaled-down image can be stored in one line memory. In consideration of this, in step S13, the CPU 50 allocates line memories corresponding to 2H, 4H, 4H, 2H and 2H of the internal memory 60 to the preprocessing circuit 22, the YC signal processing circuit 24, the zoom-out circuit 26, the post-filter 28 and the vertical enlargement circuit 36, respectively. The capacity of the internal memory 60 is sufficient for this allocation. Therefore, no allocation of the external memory 16 is performed.

In step S16, the CPU 50 determines that the external memory 16 is used because rotation must be performed, and the process proceeds to step S22.

The series of processing by the preprocessing circuit 22, the YC signal processing circuit 24, the zoom-out circuit 26 and the post-filter 28 in the subsequent steps are substantially the same as those in the example of FIG. 6, except that the scaling factor of the zooming is different. Note however that the YC signal processing circuit 24 and the zoom-out circuit 26 perform rotation using the external memory 16, although description on rotation is omitted in the flowchart in FIGS. 3 and 4.

Figure 10A:
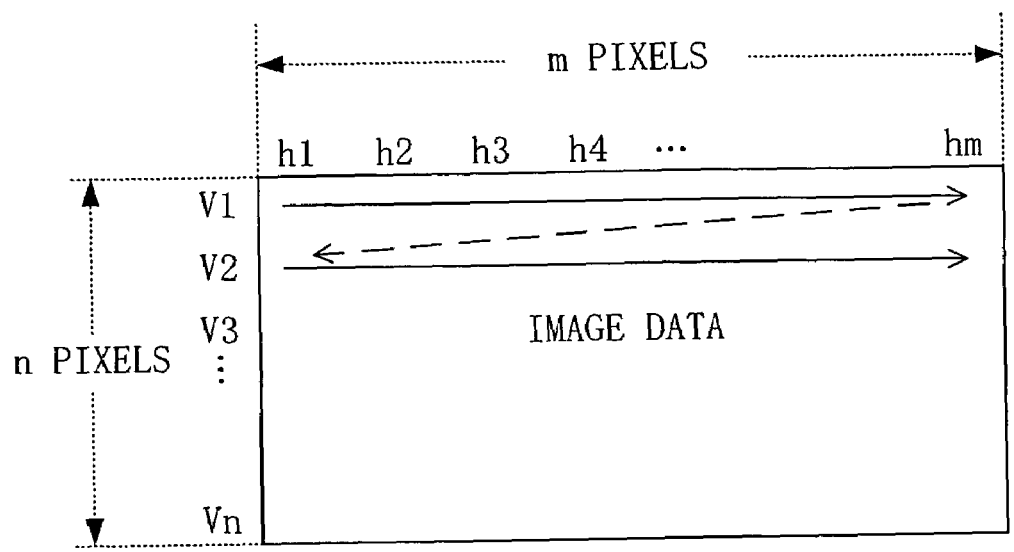
FIG. 10A is a view illustrating an example of the order of pixels written in rotation processing.
Figure 10B:
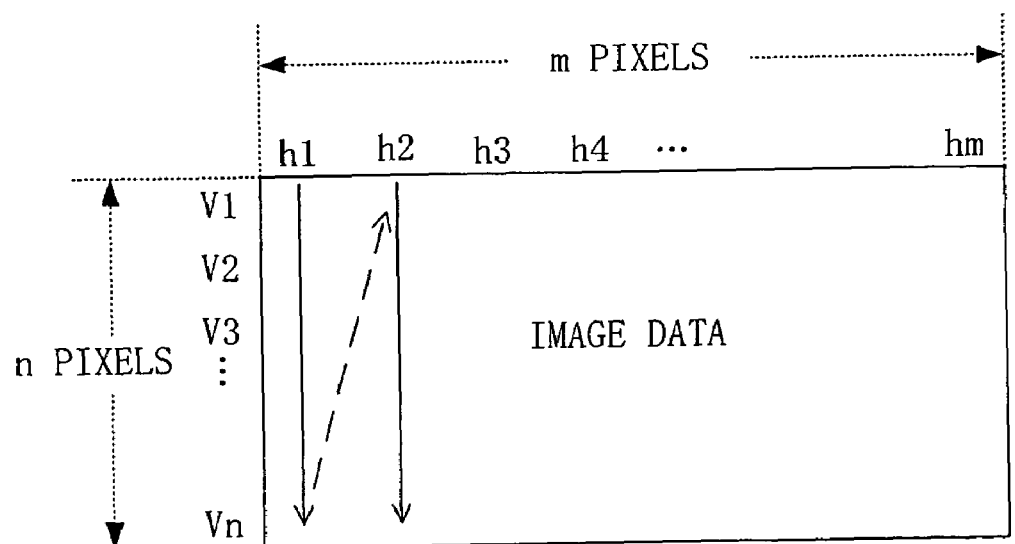
FIG. 10B is a view illustrating an example of the order of pixels read in rotation processing.

The rotation processing will be described. FIG. 10A is a view illustrating an example of the order of pixels written into the external memory 16 in rotation processing, and FIG. 10B is a view illustrating an example of the order of pixels read from the external memory 16 in rotation processing. As shown in FIGS. 10A and 10B, an image output from the YC signal processing circuit 24 has m pixels horizontally and n pixels vertically. With coordinate values v1, v2, . . . , vn given to the horizontal rows and coordinate values h1, h2, . . . , hm given to the vertical columns, each pixel can be represented by the horizontal and vertical coordinates, like h1v1.

The YC signal processing circuit 24 writes the YC-signal processed data of pixels into the external memory 16 by horizontal row of pixels in an image sequentially. Specifically, as shown in FIG. 10A, pixels of the first row are written in the order of h1v1, h2v1, . . . , hmv1, and then pixels of the second row are written in the order of h1v2, h2v2, . . . , hmv2. In this manner, pixels of the subsequent rows through the n-th row are sequentially written.

Thereafter, the zoom-out circuit 26 reads the data of pixels written by the YC signal processing circuit 24 from the external memory 16 by vertical column of pixels in the image as it was before being written. Specifically, as shown in FIG. 10B, pixels of the first column are read in the order of h1v1, h1v2, . . . , h1vn, and then pixels of the second column are read in the order of h2v1, h2v2, . . . , h2vn. In this manner, pixels of the subsequent columns through the m-th column are sequentially read.

The data of pixels of each column read in the above processing is handled as data of pixels of each horizontal row. In this way, an image rotated by 90° from the image as it was before being written in the external memory 16 is obtained.

The zoom-out circuit 26 then performs zooming for the rotated image by reducing the horizontal number of pixels of the image to ½, and outputs the results to the post-filter 28. After processing by the post-filter 28, the vertical enlargement circuit 36 performs vertical enlargement using the internal memory 60 and outputs the results to the output section 70.

As described above, by use of the external memory 16, rotation of an image can be easily performed as an extended function.

Data of pixels may be written into the external memory 16 by vertical column of pixels in an image as shown in FIG. 10B, and thereafter, be read from the external memory 16 by horizontal row of pixels in the image as it was before being written.

Any of the preprocessing circuit 22, the YC signal processing circuit 24, the zoom-out circuit 26 and the post-filter 28 may write data into the external memory 16, and the circuit that is to perform processing next may read the data from the external memory 16. In this case, however, the read of the data from the external memory 16 must have been finished before the JPEG processing circuit 34 receives data.

Figure 11:
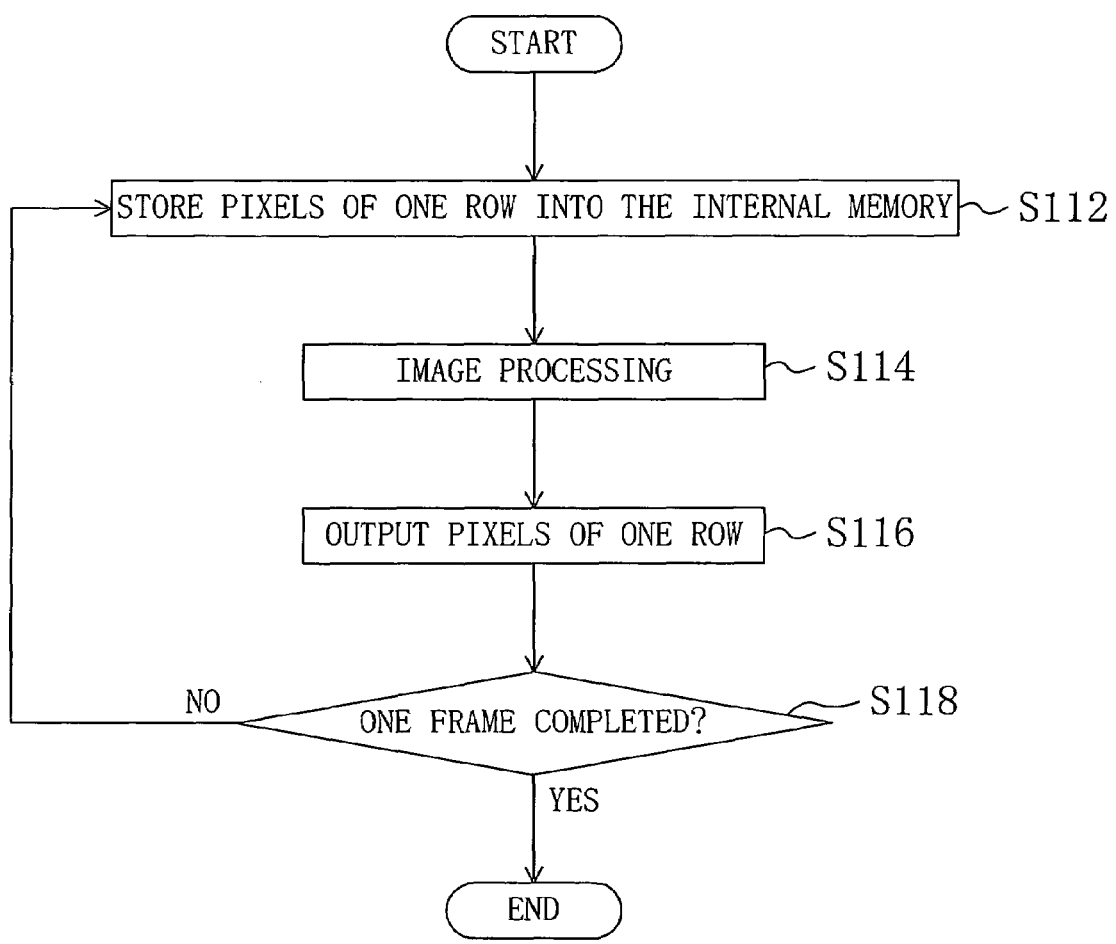
FIG. 11 is a flowchart showing transfer of pixel data in image processing followed when no external memory is used.

Although already described with reference to FIG. 7, transfer of pixel data followed when the external memory 16 is not used is summarized as follows. FIG. 11 is a flowchart showing transfer of pixel data in image processing followed when the external memory 16 is not used.

In step S112, the CPU 50 stores pixel data of one row into the internal memory 60. In step S114, the image processing section 20 performs various types of image processing using the internal memory 60. In step S116, the image processing section 20 outputs the image-processed pixel data of one row to the output section 70. In step S118, the CPU 50 determines whether or not processing of one frame has been completed. If completed, the process is terminated. Otherwise, the process returns to step S112.

Since pixels of one row of an image are not stored over a plurality of line memories in the internal memory 60, m is the maximum number of pixels allowed to be stored in the internal memory as one row of pixels. Therefore, if the external memory 16 is not used, the image processing device 100 can process only an image having m or less pixels horizontally.

By using an external memory, processing of an image having more than m pixels horizontally is made possible. Hereinafter, discussed will be the case that the image processing device 100 processes an image having more than m pixels horizontally using an external memory.

Figure 12:
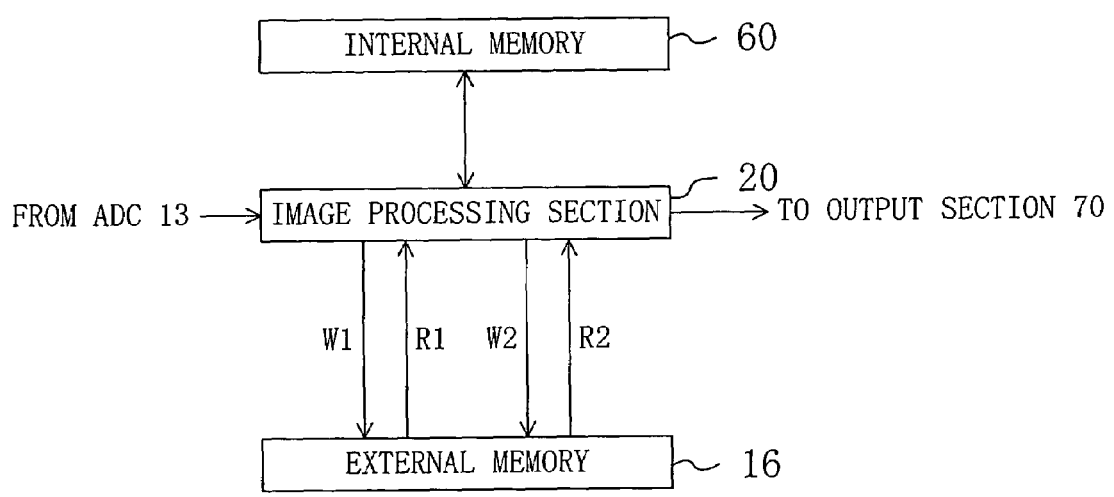
FIG. 12 is a view illustrating an example of a flow of data in processing of an image having more than m pixels horizontally.
Figure 13A:
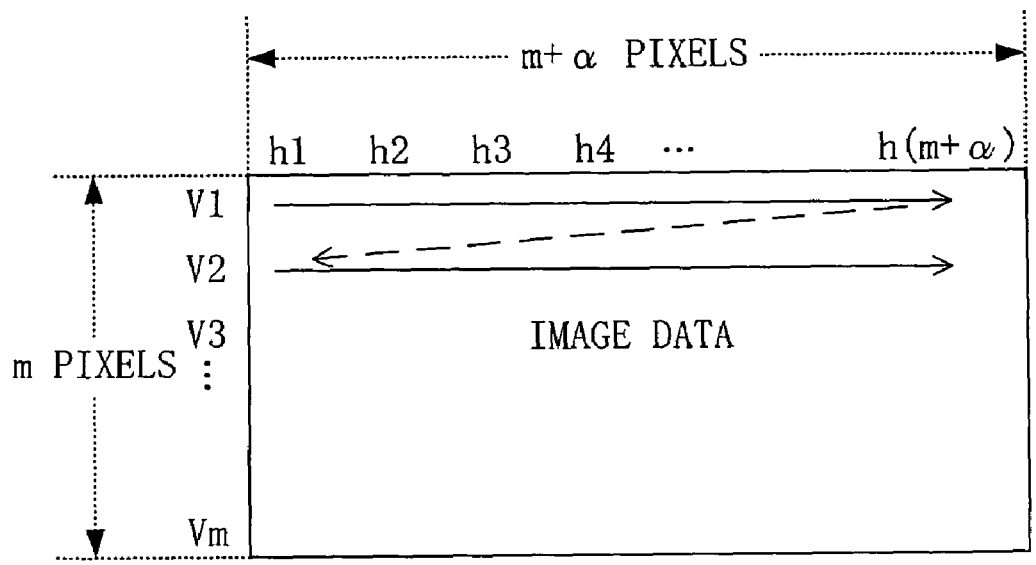
FIG. 13A is a view illustrating an example of the order of pixels transferred, in the case that the horizontal number of pixels exceeds m.
Figure 13B:
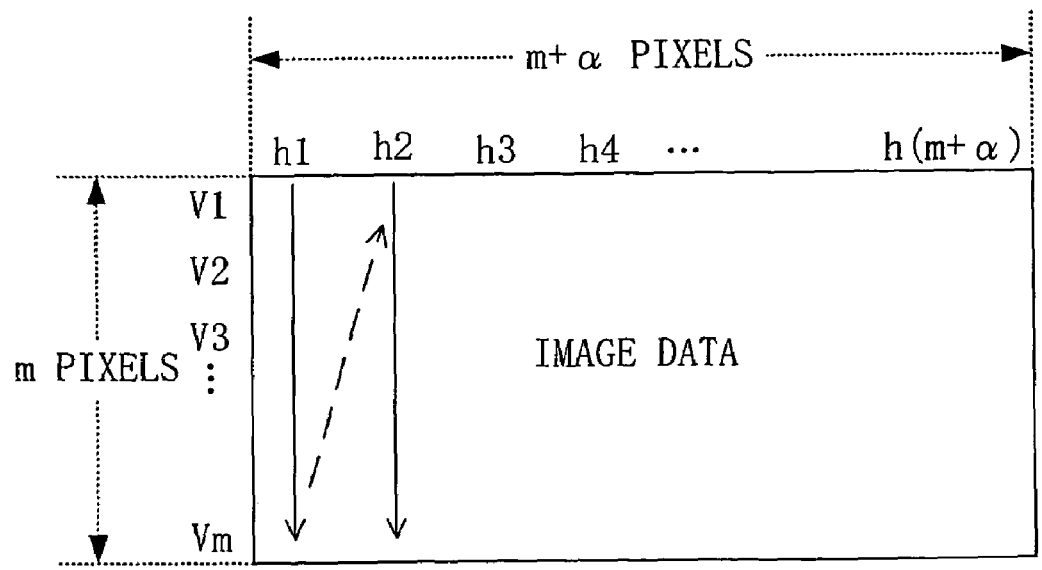
FIG. 13B is a view illustrating another example of the order of pixels transferred, in the case that the horizontal number of pixels exceeds m.

FIG. 12 is a view illustrating an example of a flow of data in processing of an image having more than m pixels horizontally. FIGS. 13A and 13B are views illustrating examples of the order of pixels transferred, in the case that the horizontal number of pixels exceeds m. The image shown in FIGS. 13A and 13B has m+α pixels (α is a natural number) horizontally and m pixels vertically. Coordinate values v1, v2, ..., vm are given to the respective horizontal rows, and coordinate values h1, h2, ..., h(m+α) are given to the respective vertical columns.

Image processing for an image having more than m pixels horizontally is not allowed because the internal memory 60 fails to store pixel data of one row of such an image in one line memory. However, as for the image in FIG. 13A, since this image has m pixels vertically, processing can be made by storing pixels of one column in one line memory.

Figure 14:
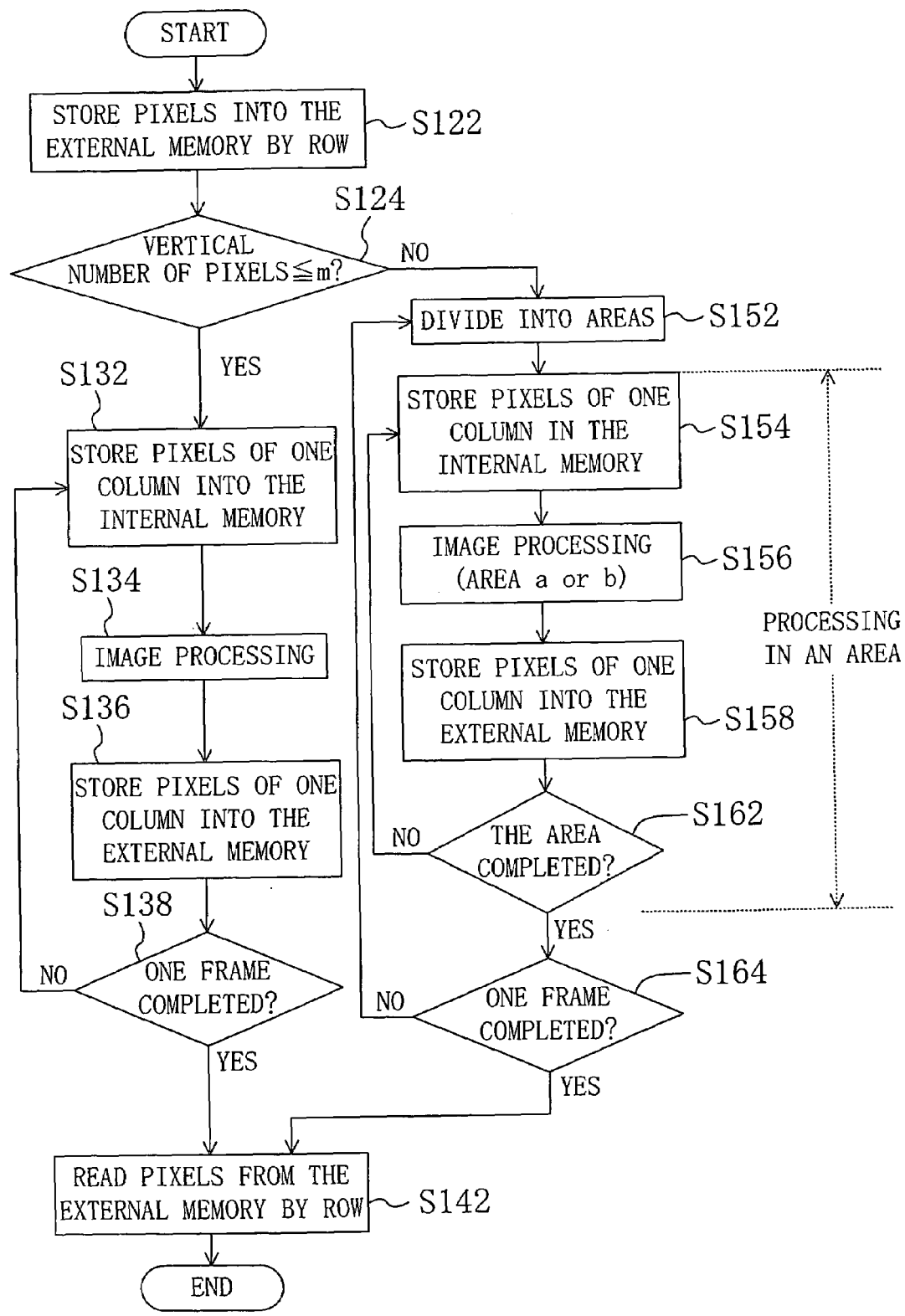
FIG. 14 is a flowchart showing an example of a flow of processing performed by the image processing device in FIG. 1 in the case of processing an image having more than m pixels horizontally.

FIG. 14 is a flowchart showing an example of a flow of processing performed by the image processing device 100 in FIG. 1 in the case of processing an image having more than m pixels horizontally. The processing in this case will be described with reference to FIGS. 12 to 14.

In step S122 in FIG. 14, the image processing section 20 stores pixel data output from the AD converter 13 into the external memory 16 by row of pixels (W1 in FIG. 12). Specifically, as shown in FIG. 13A, pixels of the first row are written in the order of h1v1, h2v1, ..., h(m+α)v1 and then pixels of the second row are written in the order of h1v2, h2v2, ..., h(m+α)v2. The write continues in this way for the subsequent rows through the m-th row.

In step S124, the CPU 50 determines whether or not the number of pixels in the vertical direction (vertical number of pixels) of an image is m or less. If the vertical number of pixel is m or less, the process proceeds to step S132. Otherwise it proceeds to step S152. In the case of the image in FIG. 13A, the process proceeds to step S132.

In step S132, the image processing section 20 reads pixel data of one column from the external memory 16 (R1 in FIG. 12) and transfers the data to the internal memory 60 for storage. That is, pixels are read in the order of h1v1, h1v2, ..., h1vm as shown in FIG. 13B, for example.

In step S134, the image processing section 20 performs image processing such as preprocessing, YC signal processing, zooming and post-filtering using the internal memory 60 to obtain the pixel data of one column.

In step S136, the image processing section 20 stores the processed pixel data of one column into the external memory 16 (W2 in FIG. 12). In this storage, the processed pixel data of one column is written in the area in which the corresponding pixel data of one column before the processing had been stored.

In step S138, the CPU 50 determines whether or not processing of one frame has been completed. If completed, the process proceeds to step S142. Otherwise it returns to step S132.

In step S142, the image processing section 20 reads pixel data of the resultant image from the external memory 16 by row of pixels as shown in FIG. 13A, for example (R2 in FIG. 12). If further processing such as JPEG compression is required, such processing is performed for the read image, and the results are output to the output section 70.

As described above, by use of an external memory, the image processing device 100 adapted to process an image having a horizontal number of pixels of m or less can perform various types of image processing for even an image having a horizontal number of pixels exceeding m without the necessity of changing the circuit configuration as long as the vertical number of pixels of the image is m or less.

Figure 15:
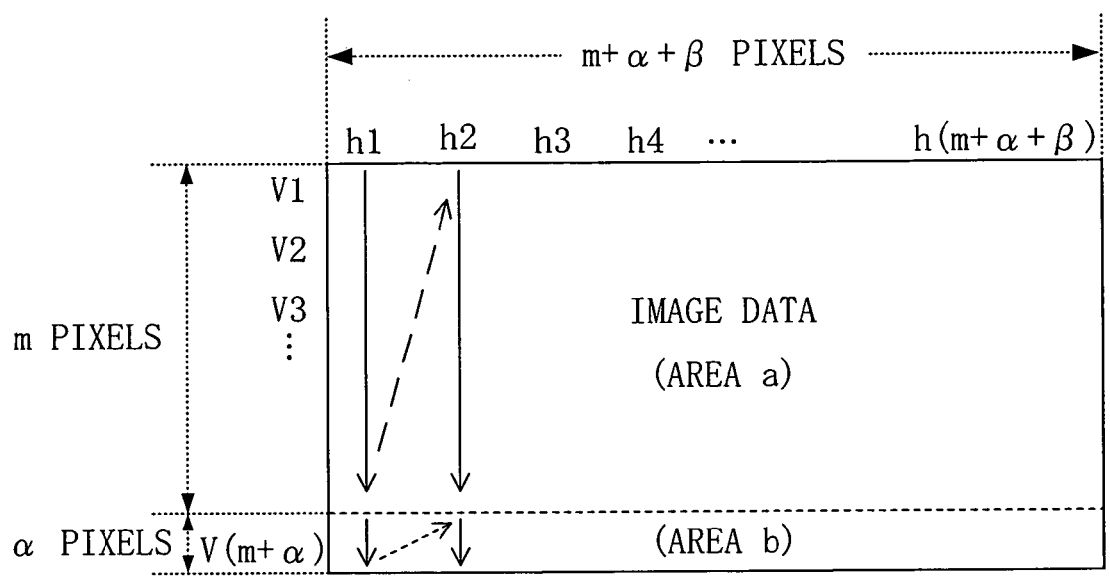
FIG. 15 is a view illustrating an example of the order of pixels transferred, in the case that both the horizontal and vertical numbers of pixels exceed m.
Figure 16:
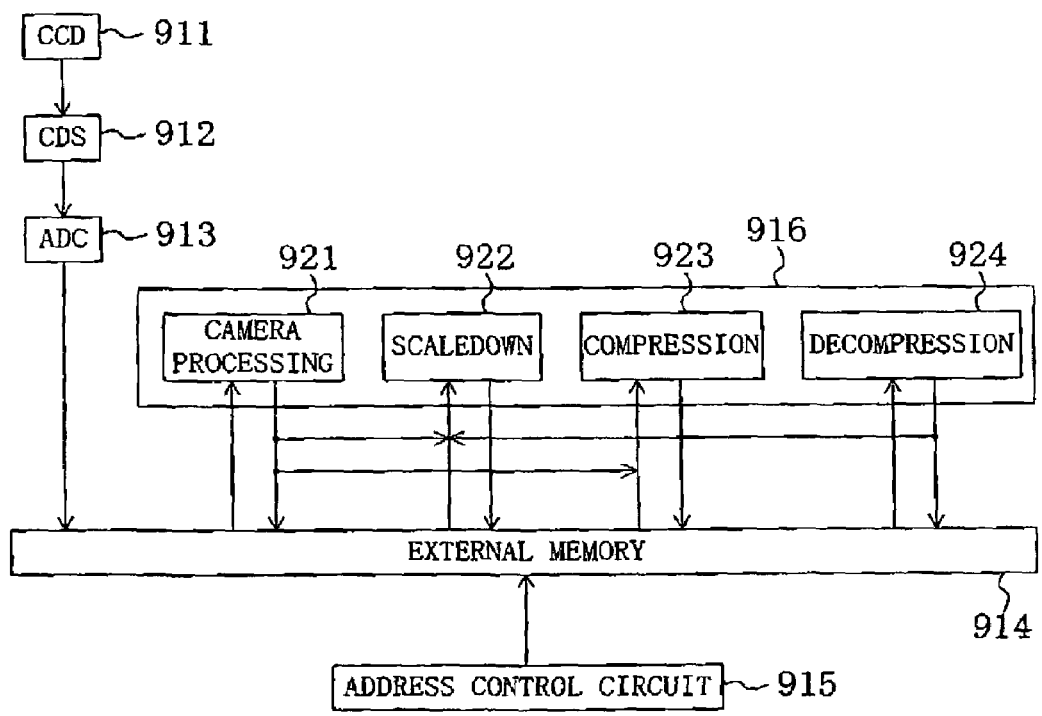
FIG. 16 is a block diagram of an example of a conventional camera.

Hereinafter, processing for an image having both horizontal and vertical numbers of pixels exceeding m will be described. FIG. 15 is a view illustrating an example of the order of pixels transferred, in the case that both the horizontal and vertical numbers of pixels of an image exceed m. The image in FIG. 15 has m+α+β pixels (β is a natural number) horizontally and m+α pixels vertically. Coordinate values v1, v2, ..., v(m+α) are given to the respective horizontal rows, and coordinate values h1, h2, ..., h(m+α+β) are given to the respective vertical columns.

The processing in the above case will be described with reference to FIG. 14. In step S122, the CPU 50 stores pixel data output from the AD converter 13 into the external memory 16 by row of pixels. Specifically, pixels of the first row are written in the order of h1v1, h2v1, ..., h(m+α+β)v1, and the write continues in this way for the subsequent rows through the (m+α)th row.

In the case of the image in FIG. 15, it is determined that the vertical number of pixels is not m or less in step S124, and the process proceeds to step S152.

In step S152, the CPU 50 divides the image in FIG. 15 into area a including the first to m-th rows and area b including the other rows.

In step S154, the CPU 50 selects which area is to be processed, area a or area b. Also, the image processing device 100 reads pixel data of one column from the external memory 16 and transfers the data to the internal memory 60 for storage. That is, as shown in FIG. 15, if area a is selected, pixels are read in the order of h1v1, h1v2, ..., h1vm, for example. If area b is selected, pixels are read in the order of h1v(m+1), h1v(m+2) ..., h1v(m+α), for example.

The processing details in steps S156 and S158 are the same as those in steps S134 and S136, although in steps S156 and S158, the processing is performed only for the selected area.

In step S162, the CPU 50 determines whether or not processing in the selected area has been completed. If completed, the process proceeds to step S164. Otherwise it returns to step S154 for processing of the remaining area.

In step S164, the CPU 50 determines whether or not processing of one frame has been completed. If completed, the process proceeds to step S142. Otherwise it returns to step S152.

As described above with reference to FIGS. 14 and 15, by use of an external memory, the image processing device 100 adapted to process an image having a horizontal number of pixels of m or less can perform various types of image processing for even an image having both vertical and horizontal numbers of pixels exceeding m without the necessity of changing the circuit configuration.

As described in the above embodiment, the image processing device 100 in FIG. 1 can perform image processing in both the cases of using an external memory and using no external memory.

In the case that the external memory 16 is not provided, the image processing device 100 can perform basic image processing such as YC signal processing and compression. In this case, with no access to the external memory 16, the power consumption can be reduced and the processing speed can be enhanced.

In the case that the external memory 16 is provided, it is possible to perform OSD processing, rotation, processing of a large image having a vertical or horizontal number of pixels exceeding m and the like.

In the above description, the AD converter 13 was provided outside the image processing device 100. Alternatively, the image processing device may include the AD converter 13.

Thus, according to the present invention, it is possible to realize an image processing device capable of achieving both low power consumption and multi-function capability. In addition, it is possible to realize a highly versatile image processing device that is operable regardless of the presence or absence of an external memory and thus usable for various systems.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. An image processing device for performing image processing for an image signal output from an image sensor and outputting the results, comprising:
    an internal memory having line memories for storing an image by row or column as a unit;
    an image processing section for performing the image processing using the internal memory; and
    a CPU for controlling the image processing section,
    wherein the image processing section includes a plurality of processing circuits each performing predetermined processing as the image processing, and
    the CPU determines whether or not each predetermined processing is performed with use of an external memory, and switches between a first processing mode using only the internal memory and a second processing mode using the internal and/or external memory based on said determination.

2. The device of claim 1, the image processing section performs given processing as the image processing without use of the external memory when the given processing can be performed without use of the external memory.

3. The device of claim 1, wherein the CPU outputs a control signal for reducing power consumed by the external memory when the image processing section does not use the external memory.

4. The device of claim 1, wherein the image processing section includes as the plurality of processing circuits:
    a luminance/color-difference signal processing circuit for converting the image signal obtained from the image sensor to a luminance signal and a color-difference signal and outputting the converted signals; and
    a compression circuit for performing compression coding of an image corresponding to the output of the luminance/color-difference signal processing circuit and outputting the results as an output of the image processing section.

5. The device of claim 1, wherein the image processing section includes an on-screen display processing circuit for superimposing an image read from the external memory on the image obtained from the image sensor and outputting the results.

6. The device of claim 1, wherein one of the plurality of processing circuits stores a processed image into the external memory sequentially by row or column as a unit, and
    another one of the plurality of processing circuits reads the image stored in the external memory by column or row as a unit whichever different from the unit used during the storing of the image.

7. The device of claim 1, wherein at least two of the plurality of processing circuits perform processing using the same internal memory.

8. The device of claim 1, wherein the image processing section stores the image output from the image sensor into the external memory, reads the stored image from the external memory by row or column as a unit whichever has a smaller number of pixels, performs the image processing for the read data using the internal memory, stores the results into an area of the external memory in which the corresponding pixel data had been stored before being read, and reads the resultant image from the external memory to be output.

9. The device of claim 8, wherein the image processing section divides the image into a plurality of areas if the number of pixels of each row or column of the image whichever is smaller exceeds the number of pixels allowed to be stored in the internal memory.

10. A camera comprising:
    the image processing device of claim 4;
    an image sensor for outputting an image signal to the image processing device; and
    a recording device for writing an output of the image processing device into a recording medium.

* * * * *